(12) United States Patent
Liang et al.

(10) Patent No.: US 12,013,498 B1
(45) Date of Patent: Jun. 18, 2024

(54) LOW-FREQUENCY ACOUSTIC WAVE GENERATING DEVICE FOR DETECTING PIPELINE BLOCKAGE

(71) Applicants: Ningbo Institute of Dalian University of Technology, Ningbo (CN); Dalian University of Technology, Dalian (CN)

(72) Inventors: Huiyong Liang, Pizhou (CN); Jiafei Zhao, Dalian (CN); Xin Lv, Beijing (CN); Yongchen Song, Dalian (CN); Jiawei Chu, Anqing (CN); Shi Shen, Liaoyang (CN); Lei Yang, Dalian (CN); Xingyu Lu, Taiyuan (CN); Linan Zhao, Beipiao (CN); Shuangqing Zhang, Hefei (CN)

(73) Assignees: NINGBO INST. OF DALIAN UNIVERSITY OF TECHNOLOGY, Ningbo (CN); DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 18/402,692

(22) Filed: Jan. 2, 2024

(30) Foreign Application Priority Data

Mar. 2, 2023 (CN) .......................... 202310216389.2

(51) Int. Cl.
*G01N 29/00* (2006.01)
*F17D 5/00* (2006.01)
(Continued)

(52) U.S. Cl.
CPC .............. *G01S 7/521* (2013.01); *F17D 5/005* (2013.01); *G01S 15/88* (2013.01)

(58) Field of Classification Search
CPC ................................ F17D 5/005; G01S 15/88
See application file for complete search history.

(56) References Cited

U.S. PATENT DOCUMENTS

| 11,754,425 B2 * | 9/2023 | Newman ................. F16L 55/48 73/37 |
| 2003/0033879 A1 * | 2/2003 | Adewumi .............. G01N 29/40 73/627 |

(Continued)

FOREIGN PATENT DOCUMENTS

| CN | 205620355 U | * 12/2015 |
| CN | 210753617 U | 6/2020 |
| CN | 112799077 A | 5/2021 |

OTHER PUBLICATIONS

CNIPA, Notification of First Office Action for CN202310216389.2, Oct. 12, 2023.

(Continued)

*Primary Examiner* — Hongmin Fan
(74) *Attorney, Agent, or Firm* — Zhigang Ma (57) ABSTRACT

A low-frequency acoustic wave generating device for detecting pipeline blockage related to the technical field of pipeline detection is provided and includes a sealing shell configured to be communicated with a pipeline, a sealed pressure environment is formed inside the sealing shell. A low-frequency electroacoustic transducer is disposed inside the sealing shell, the low-frequency electroacoustic transducer is connected to a signal generator and is configured to transmit an acoustic wave into the pipeline. The device transmits the acoustic wave signals to a high-pressure gas pipeline, combined with a signal generator capable of generating any waveform, thereby emitting any waveform of acoustic wave signal into the pipeline. The use of acoustic waves with special markings and characteristics for pipeline blockage detection can improve the anti-noise interference ability of the acoustic wave detection, and improve the precision of the detection.

6 Claims, 4 Drawing Sheets

(51) Int. Cl.
    *G01S 7/521*    (2006.01)
    *G01S 15/88*    (2006.01)

(56) References Cited

U.S. PATENT DOCUMENTS

2019/0310364 A1* 10/2019 Martin ............... G01N 29/4463
2021/0332953 A1* 10/2021 Jagannathan ............ F17D 5/06
2022/0276116 A1*  9/2022 Sadovnychiy ...... G01M 3/2807

OTHER PUBLICATIONS

Dalian University of Technology Ningbo Research Institute and Dalian University of Technology (Applicants), Reply to Notification of First Office Action for CN202310216389.2, w/ (allowed) replacement claims, Nov. 8, 2023.
CNIPA, Notification to grant patent right for invention in CN202310216389.2, Nov. 21, 2023.

* cited by examiner

LOW-FREQUENCY ACOUSTIC WAVE GENERATING DEVICE FOR DETECTING PIPELINE BLOCKAGE

TECHNICAL FIELD

The disclosure relates to the field of pipeline detection technologies, and particularly to a low-frequency acoustic wave generating device for detecting pipeline blockage.

BACKGROUND

Pipeline transportation is the main mode of transportation for long-distance delivery of oil and natural gas due to the advantages of large freight volume, low energy consumption, and small area occupation. Pipeline transportation occupies an increasingly important position in the national economy. Since the extracted oil and natural gas contain water, in high-pressure and low-temperature pipeline environments, the natural gas and water contained in pipelines are prone to the formation of solid natural gas hydrate, which is easy to cause pipeline blockage. In addition to the pipeline blockage of the solid natural gas hydrate, the pipelines are also prone to the blockages of paraffin, asphaltene, sediment and corrosion products. Incomplete blockage in the pipeline will reduce the efficiency of pipeline transportation, thereby increasing the cost of transportation. And complete blockage in the pipeline will lead to shutdowns and may lead to local ultra-high-pressure damage to the pipelines and other serious accidents. Therefore, the pipeline blockage will cause serious economic losses and environmental pollution, and even personal injury. If the location and degree of the pipeline blockage can be detected promptly in the early stage of pipeline blockage, targeted measures can be taken to eliminate the blockage and prevent serious pipeline blockage accidents.

Acoustic wave reflection method for blockage location is a common method to detect pipeline blockage. By transmitting the acoustic waves into the pipeline and receiving the acoustic waves reflected from the blockage, the blockage location is calculated according to the time difference between the incident wave and the reflected wave. During the acoustic wave detection, low-frequency acoustic signals need to be transmitted to the pipeline. Due to the high-pressure environment inside the pipeline, a general acoustic emission transducer cannot directly emit the acoustic wave into the pipeline, and thus the current method used is to release air through an electromagnetic valve to generate negative pressure waves. However, the characteristics of negative pressure waves are difficult to control. Due to the noise inside the pipeline, characteristic acoustic waves need to be emitted. Currently, there is no electroacoustic transducer that can emit adjustable waveforms inside the pipeline.

Figure 5:
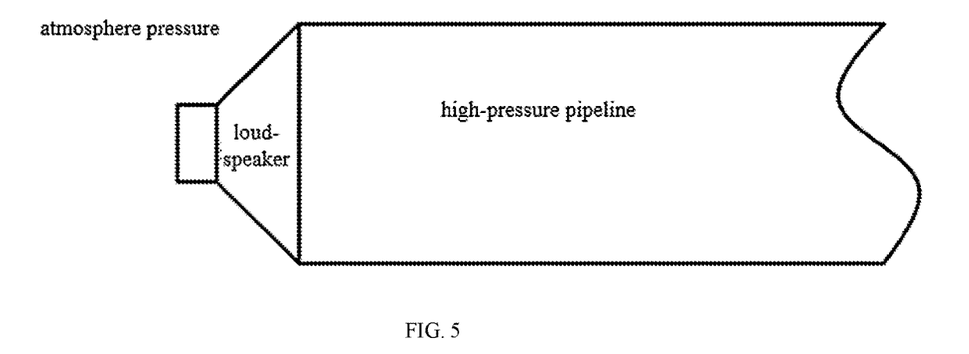
FIG. 5 illustrates a schematic diagram of a loudspeaker in the related art.

Specifically, as shown in FIG. 5, a general loudspeaker (i.e., electroacoustic transducer), such as a moving-coil loudspeaker, can only be used in an atmospheric pressure environment. If the loudspeaker is directly connected to the high-pressure pipeline, paper cones of the loudspeaker must be in contact with the high-pressure medium to emit acoustic waves into the pipeline, and the whole loudspeaker is in the atmospheric pressure environment. In this situation, there will be a pressure difference between the two sides of the paper cones of the loudspeaker, and the outflow of the medium under the action of the pressure difference may damage the loudspeaker.

SUMMARY

To solve the above-mentioned problems, the disclosure provides a low-frequency acoustic wave generating device for detecting pipeline blockage to solve the problems in the related art. To achieve the above objectives, the technical solutions adopted by the disclosure are as follows.

Specifically, a low-frequency acoustic wave generating device for detecting pipeline blockage includes a sealing shell configured to be communicated with a pipeline, and a sealed pressure environment is formed inside the sealing shell. A low-frequency electroacoustic transducer is disposed inside the sealing shell, the low-frequency electroacoustic transducer is connected to a signal generator and is configured to transmit an acoustic wave into a pipeline. It should be noted that the low-frequency acoustic wave refers to the acoustic wave with a frequency below a first cut-off frequency of the pipeline, and the first cut-off frequency is related to the size and the shape of the pipeline.

In an embodiment, the sealing shell includes a pressure-resistant shell and a connecting head. The pressure-resistant shell defines a sealing chamber with an opening, and the connecting head defines a hollow structure and is communicated with the sealing chamber. An end of the connecting head is detachably connected to an end at the opening of the pressure-resistant shell, and the other end of the connecting head extends out of the pressure-resistant shell and is configured to be communicated with the pipeline.

In an embodiment, the low-frequency electroacoustic transducer is disposed in the sealing chamber, and an acoustic emission end of the low-frequency electroacoustic transducer faces towards the hollow structure of the connecting head.

In an embodiment, an end of the connecting head disposed in the sealing chamber is in a clearance distribution with the low-frequency electroacoustic transducer.

In an embodiment, the low-frequency electroacoustic transducer is disposed at the end of the connecting head disposed in the sealing chamber of the pressure-resistant shell.

In an embodiment, the low-frequency electroacoustic transducer is connected to the end of the connecting head through screws, gaskets are sleeved on the screws respectively, and the gaskets are disposed between the end of the connecting head and the low-frequency electroacoustic transducer, thereby forming a gap.

In an embodiment, the hollow structure of the connecting head is in a cone-shape, and the end of the connecting head with a larger surface compared to that of the other end of the connecting head is disposed in the sealing chamber.

In an embodiment, the low-frequency electroacoustic transducer is connected to a signal generator through a wire, the wire extends out of the pressure-resistant shell, and a part of the wire passing through the pressure-resistant shell is sealed by a sealing mechanism.

In an embodiment, the sealing mechanism includes a sealing plug, and the sealing plug is detachably connected to the pressure-resistant shell. The sealing plug defines a wire threading hole communicated with the sealing chamber, and the wire extends from the wire threading hole. A perforated gasket (also referred to as sealing soft pad) sleeved on the wire is disposed in the wire threading hole, and the perforated gasket is in a squeezed state, thereby forming a sealed connection between the wire and the perforated gasket.

In an embodiment, the wire threading hole is in a stepped hole structure, including a large diameter part and a small diameter part. The large diameter part is provided with a gasket upper end cover. The perforated gasket is disposed in the large diameter part, a side of the perforated gasket abuts against the small diameter part, and the other side of the perforated gasket abuts against the gasket upper end cover. The wire passes through the gasket upper end cover, the sealing plug is detachably connected to a pressure cap, and the pressure cap compresses the gasket upper end cover.

In an embodiment, the pressure cap is buckled on the sealing plug and threaded to the scaling plug, the pressure cap defines a through hole adapted to the gasket upper end cover, and an end of the gasket upper end cover facing away from the perforated gasket is disposed inside the through holes.

A lateral surface of the gasket upper end cover is provided with protrusions, the protrusions abut against the pressure cap, positioning pins are provided on the protrusions, and the positioning pins are inserted into pin holes at an end of the sealing plug respectively.

The beneficial effects of the disclosure are as follows. The low-frequency acoustic wave generating device for detecting pipeline blockage can transmit the acoustic wave signals to a high-pressure gas pipeline, combined with a signal generator capable of generating arbitrary waveforms, emitting any waveform of acoustic wave signal into pipeline can be realized. The use of acoustic waves with special markings and characteristics for pipeline blockage detection can improve the anti-noise interference ability of the acoustic wave detection, and improve the precision of the detection. The purpose of transmitting low-frequency acoustic waves into the pipeline is to increase the distance of the detection. Since low-frequency acoustic waves have a relatively small attenuation and a longer propagation distance in pipelines, the distance of the detection can be increased.

Description of reference numerals: 1. connecting head; 2. blind hole; 3. scaling ring; 4. pressure-resistant shell; 5. low-frequency electroacoustic transducer; 6. wire; 7. screw; 8. gasket; 9. wire threading hole; 10. scaling gasket; 11. sealing plug; 12. pressure cap; 13. positioning pin; 14. gasket upper end cover; 15. gasket supporting base 16. perforated gasket; 501. circular connection part; 17. sealing chamber; 18. opening; 19. large diameter part; 20. small diameter part; 21. through hole; 22. protrusion; 23. pin hole.

DETAILED DESCRIPTION OF EMBODIMENTS

The following will provide a clear and complete description of the technical solution in the embodiments of the disclosure, in conjunction with FIGS. 1-6. Apparently, the described embodiments are only a part of the embodiments of the disclosure, not all of them. Unless otherwise specified, the technical means used in the embodiments are conventional means well-known to those skilled in the art.

Figure 6:
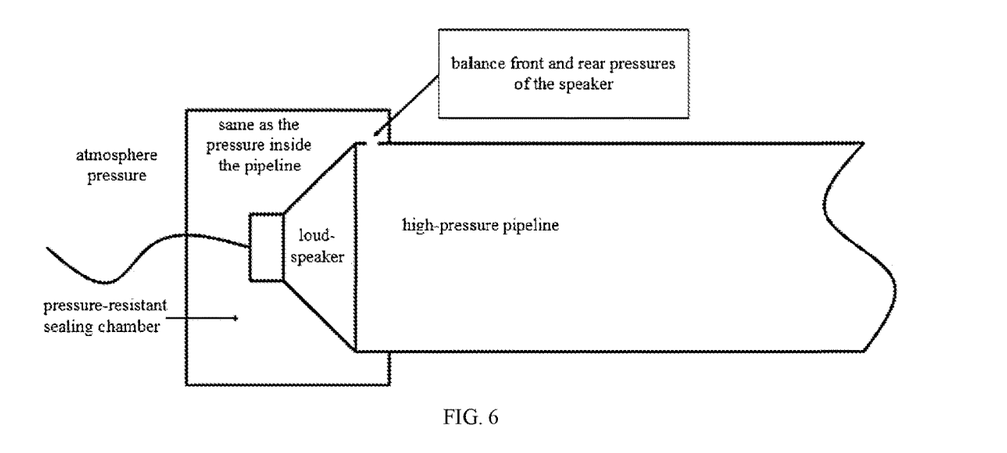
FIG. 6 illustrates a schematic diagram of the concept of the disclosure.

As shown in FIG. 6, in order to emit acoustic waves into a high-pressure pipeline, it is necessary to design a pressure-resistant sealing chamber and install a loudspeaker in the pressure-resistant sealing chamber. The sealing chamber is connected to the pipeline to ensure that the loudspeaker is in a constant pressure environment that is the same as the pressure inside the pipeline, which can eliminate the adverse effects of the pressure difference mentioned above. There is a gap at a connection between the loudspeaker and the high-pressure pipeline to ensure that the high-pressure pipeline and the sealing chamber are communicated. During the operation of the loudspeaker, the pressure on both sides of paper cones of the loudspeaker can be balanced, so that the pressure of front and rear of the loudspeaker is the same as the pressure in the pipeline.

Figure 1:
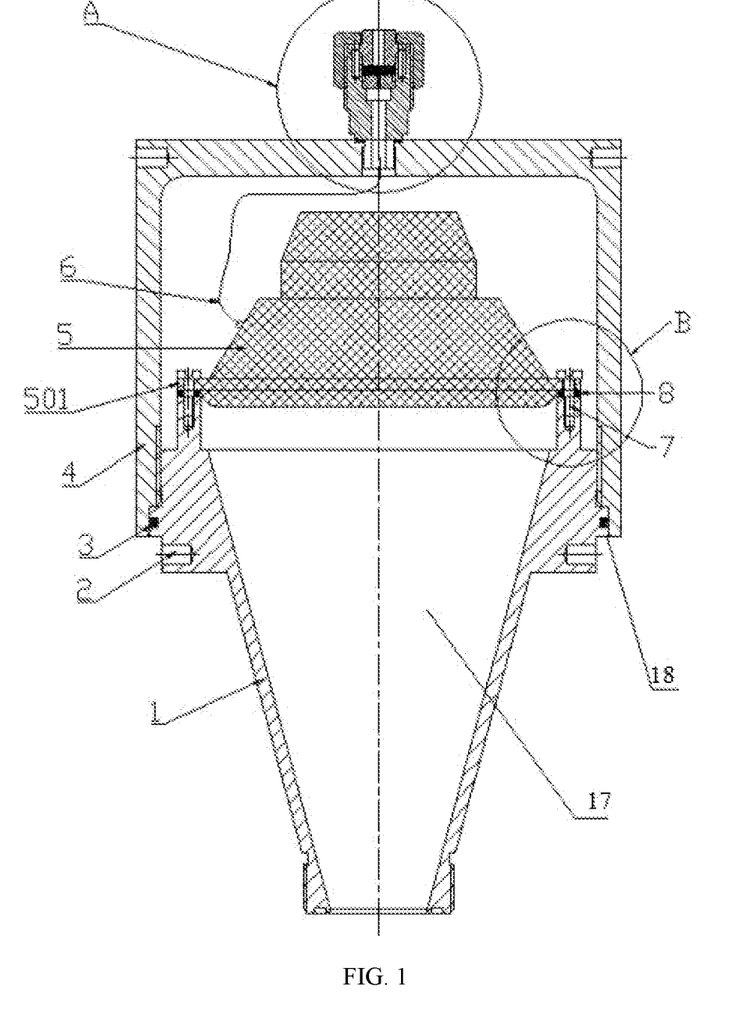
FIG. 1 illustrates a schematic diagram of an overall cross-sectional structure of a low-frequency acoustic wave generating device for detecting pipeline blockage according to the disclosure.
Figure 4:
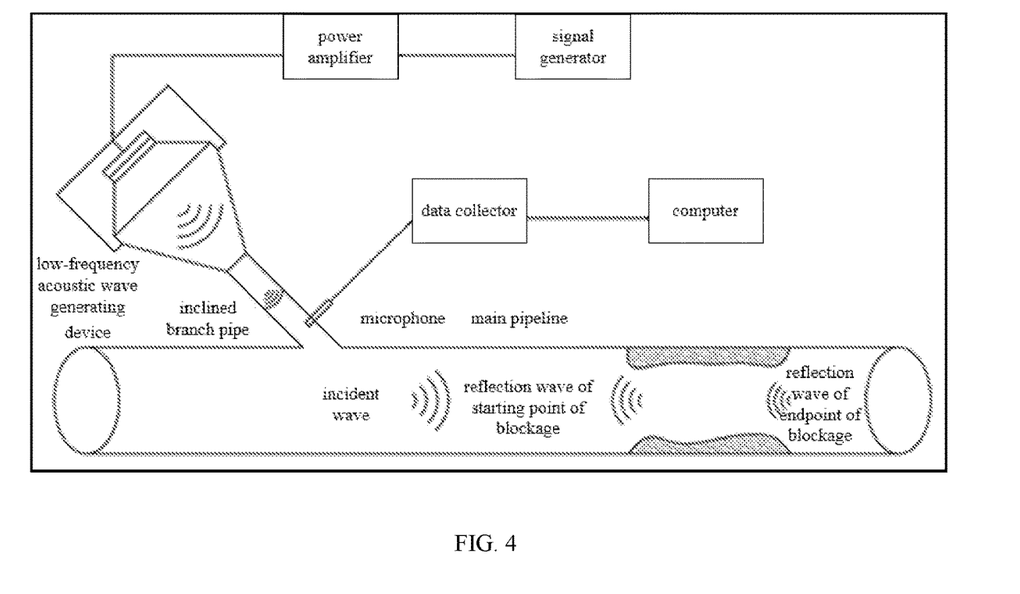
FIG. 4 illustrates a schematic diagram of a working principle of the disclosure.

Based on the above concepts and referring to FIG. 1 and FIG. 4, the disclosure provides a low-frequency acoustic wave generating device for detecting pipeline blockage. The device includes a sealing shell configured to be communicated with a pipeline, and a sealed high-pressure environment is formed inside the sealing shell with the same pressure as that in the pipeline. A low-frequency electroacoustic transducer 5 is disposed inside the sealing shell, and the low-frequency electroacoustic transducer 5 is connected to a signal generator and is configured to transmit an acoustic wave into the pipeline.

The low-frequency electroacoustic transducer 5 is provided in the related art, the low-frequency electroacoustic transducer 5 can be connected to the signal generator through a power amplifier. Specifically, the signal generator is used to generate excitation signals of any waveform. The power amplifier is used to amplify and process the excitation signals generated by the signal generator to obtain amplified excitation signals, then the amplified excitation signals are transmitted to the low-frequency electroacoustic transducer 5. The low-frequency electroacoustic transducer 5 is used to convert the amplified excitation signals input by the power amplifier into low-frequency pulse acoustic signals, followed by emitting the low-frequency pulse acoustic signals into the pipeline.

The formation of a sealed constant pressure environment inside the sealing shell is beneficial for protecting the low-frequency electroacoustic transducer 5 from medium interferences. It eliminates the pressure difference between the sealing shell and the pipeline and ensures that the pressure inside the sealing shell is the same as the pressure inside the pipelines. The disclosure solves the problem that ordinary loudspeakers cannot emit the acoustic waves into the high-pressure pipelines. Currently, the sealing chamber of the loudspeaker has been manufactured, and the goal of emitting the acoustic waves into gas pipelines with a pressure of 3 megapascals (MPa) has been achieved in the laboratory. Compared to the related art, the device of the disclosure can emit the acoustic signals into high-pressure gas pipelines in a constant pressure environment. When the device is combined in with a signal generator that can generate any waveform with the device of the disclosure, emitting the acoustic signals of any waveform into the pipeline can be realized. The acoustic waves with special markings and characteristics are used for pipeline blockage detection, which can improve the anti-noise interference ability of the acoustic detection and improve the accuracy of the acoustic detection. The purpose of transmitting low-frequency acoustic waves into the pipeline is to increase the distance of the detection. Since low-frequency acoustic waves have a relatively small attenuation and a longer propagation distance in pipelines, the distance of the detection can be increased.

In addition, the disclosure only relates to the improvement of the acoustic wave emission, and the acoustic wave reception and subsequent detection belong to the related art. For example, a microphone can be disposed on the sealing shell or the pipeline to receive an incident sound acoustic signal and an acoustic wave signal reflected by the blockage. The microphone transmits the acoustic wave signals to a data collector, and the data collector performs analog-to-digital conversion and processing on the received acoustic wave signals and transmits the processed acoustic wave signals to a computer. Then the computer analyzes and calculates the processed acoustic wave signals and determines a location of the blockage based on the time difference between the reflected acoustic wave and the incident acoustic wave, and an acoustic velocity in the pipeline. By continuously emitting low-frequency acoustic signals into the pipeline, and analyzing and calculating the received acoustic signals in real time, the blockage position can be calculated based on the time difference between the incident acoustic waves and reflected acoustic waves received by the computer. For the incomplete blockage in the pipeline, the positions of reflection wave of a starting point of the blockage and a reflection wave of an endpoint of the blockage can be calculated separately, thus achieving online monitoring of the pipeline.

Figure 3:
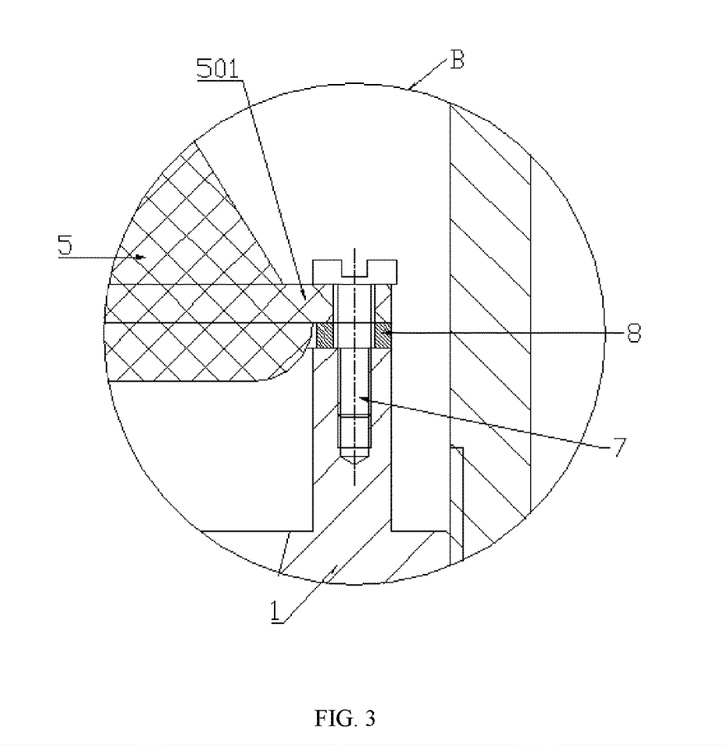
FIG. 3 illustrates a schematic enlarged cross-sectional view of a position B of the low-frequency acoustic wave generating device illustrated in FIG. 1 according to the disclosure.

Referring to FIG. 1 and FIG. 3, the specific structure of the sealing shell is illustrated as follows.

In embodiment, the sealing shell includes a pressure-resistant shell 4 and a connecting head 1, the pressure-resistant shell 4 defines a sealing chamber 17 with an opening 18, the connecting head 1 defines a hollow structure and is communicated with the sealing chamber 17. An end of the connecting head 1 is detachably connected to an end at the opening 18 of the pressure-resistant shell 4, the other end of the connecting head 1 extends out of the pressure-resistant shell 4, and is configured to be communicated with the pipeline.

The low-frequency electroacoustic transducer 5 is disposed in the sealing chamber 17, and an acoustic emission end of the low-frequency electroacoustic transducer 5 faces towards the hollow structure of the connecting head 1.

Specifically, the acoustic emission end of the low-frequency electroacoustic transducer 5 is an end of paper cones of a loudspeaker. The connecting head 1 can be connected to the pipeline through flanges, screws and threads. In a specific embodiment, the connecting head 1 is connected to the pipeline through threaded connection, that is, an external thread is provided at the end of the connecting head 1 that extends from the pressure-resistant shell 4, an inclined branch pipe or a protrusion is provided on the pipeline. In this situation, the connecting head 1 is inserted into the inclined branch pipe through the threaded connection, thereby making the pipeline be communicated with the connecting head 1. In a specific embodiment, in order to enable the entire device to detect a longer distance, the connecting head 1 is arranged in an inclined manner.

In an embodiment, an end of the connecting head 1 disposed in the sealing chamber 17 is in a clearance distribution with the low-frequency electroacoustic transducer 5.

The end of the connecting head 1 is in the clearance distribution with the low-frequency electroacoustic transducer 5, which can balance a front pressure and a rear pressure of the low-frequency electroacoustic transducer 5. In this case, when there is pressure fluctuation in the pipeline, it will not damage the loudspeaker and protect the normal operation of the low-frequency electroacoustic transducer 5.

In an embodiment, the low-frequency electroacoustic transducer 5 is disposed at the end of the connecting head 1 disposed in the sealing chamber 17 of the pressure-resistant shell 4.

In an embodiment, the low-frequency electroacoustic transducer 5 is connected to the end of the connecting head 1 through screws 7, gaskets 8 are sleeved on the screws 7 respectively. The gaskets 8 are disposed between the end of the connecting head 1 and the low-frequency electroacoustic transducer 5, thereby forming a gap.

Specifically, the multiple screws 7 are disposed around the low-frequency electroacoustic transducer 5, and are uniformly distributed in a circular array. A circular connection part 501 is disposed on the low-frequency electroacoustic transducer 5, and the multiple screws 7 are uniformly distributed on the circular connection part 501. The circular connection part 501 is adapted to an opening of the end of the connecting head 1, and the gap is formed by the gaskets 8 to separate the connecting head 1 and the low-frequency electroacoustic transducer 5.

In addition, the acoustic emission end of the low-frequency electroacoustic transducer 5 in the attached drawing is disposed inside the opening of the connecting head 1, but this is only an implementation of the disclosure, and the acoustic emission end can also be disposed outside the connecting head 1.

In an embodiment, the hollow structure of the connecting head 1 is in a cone-shape, and the end of the connecting head 1 with a larger end surface compared to that of the other end of the connecting head 1 is disposed in the sealing chamber 17.

The cone-shape hollow structure of the connecting head 1 is conducive to the concentrated output of the acoustic waves.

Specifically, the connecting head 1 is in the cone-shape as a whole, and the main purpose of the cone-shape is to change the diameter, so that a large-diameter loudspeaker can be disposed on the pipeline through a thin branch pipe. A smaller end surface of the connecting head 1 is used to connect the pipeline, and an outer circumference of a larger end surface of the connecting head 1 is disposed with a uniform circular arc surface. The uniform circular arc surface is inserted in the opening 18 of the pressure-resistant shell 4 and can be connected to the pressure-resistant shell 4 through the threads. A sealing ring 3 is disposed between the outer circumference of the connecting head 1 and an inner side of the pressure-resistant shell 4 to improve the sealing performance. The connecting head 1 defines blind holes 2 on the uniform circular arc surface of the connecting head 1, the blind holes are defined at the outside of the pressure-resistant shell 4 to facilitate the rotational disassembly of the connecting head 1 by the blind hole 2.

Figure 2:
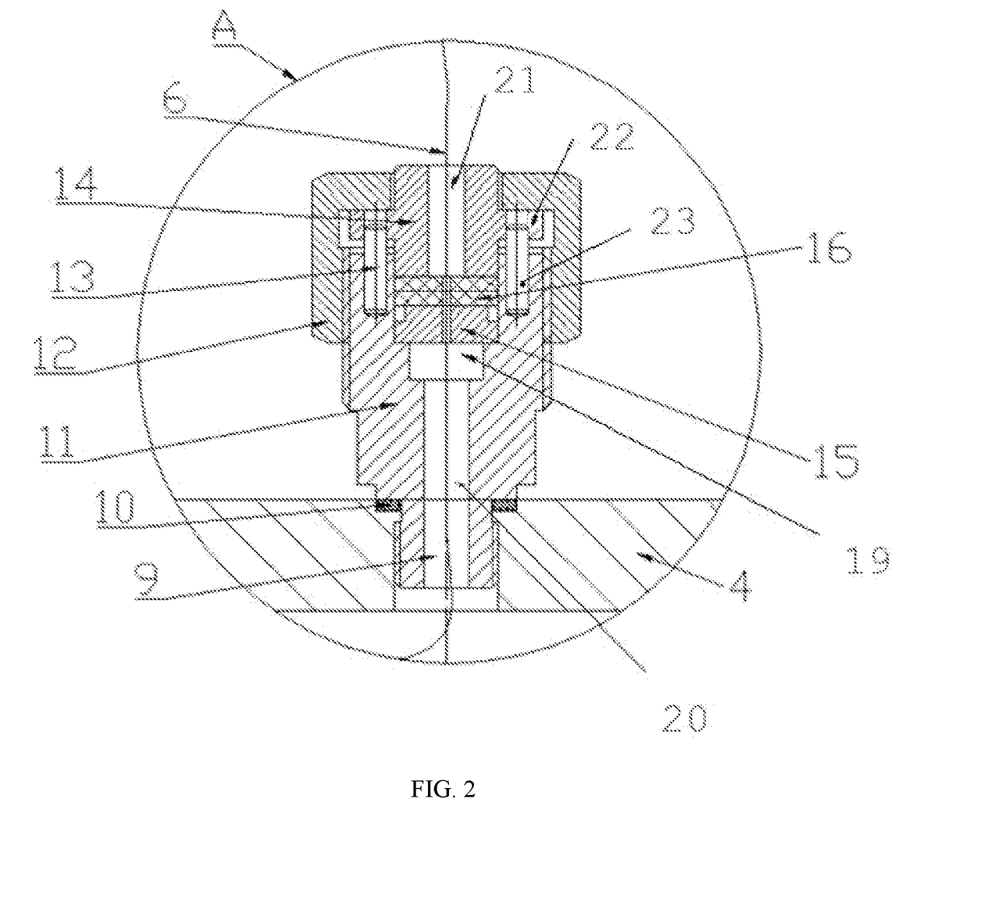
FIG. 2 illustrates a schematic enlarged cross-sectional view of a position A of the low-frequency acoustic wave generating device illustrated in FIG. 1 according to the disclosure.

Referring to FIGS. 1 and 2, a sealing structure of a wire 6 is illustrated as follows.

In an embodiment, the low-frequency electroacoustic transducer 5 is connected to a signal generator through the wire 6, the wire 6 extends out of the pressure-resistant shell 4, and a part of the wire 6 passing through the pressure-resistant shell 4 is sealed by a sealing mechanism.

In an embodiment, the sealing mechanism includes a sealing plug 11, the sealing plug 11 is detachably connected to the pressure-resistant shell 4, the sealing plug 11 defines a wire threading hole 9 communicated with the sealing chamber 17, and the wire 6 extends from the wire threading hole 9. A perforated gasket 16 sleeved on the wire 6 is disposed in the wire threading hole 9, and the perforated gasket 16 is in a squeezed state, thereby forming a sealed connection between the wire 6 and the perforated gasket 16.

An end of the sealing plug 11 can be connected to threaded holes on the pressure-resistant shell 4 through the threaded connection, and a sealing gasket 10 is disposed between the sealing plug 11 and the pressure-resistant shell 4. The perforated gasket 16 with elasticity is a related art, which can be a rubber gasket, its inner side compresses the wire 6 to form a sealing effect.

In an embodiment, the wire threading hole 9 is in a stepped hole structure, the stepped hole structure includes a large diameter part 19 and a small diameter part 20. The large diameter part 19 is provided with a gasket upper end cover 14, the perforated gasket 16 is disposed in the large diameter part 19, a side of the perforated gasket 16 abuts against the small diameter part 20, and the other side of the perforated gasket 16 abuts against the gasket upper end cover 14. The wire 6 passes through the gasket upper end cover 14, the sealing plug 11 is detachably connected to a pressure cap 12, and the pressure cap 12 compresses the gasket upper end cover 14.

Specifically, the large diameter part 19 is located at an end of the wire threading hole 9 facing away from the pressure-resistant shell 4. The gasket upper end cover 14 is a hollow cylindrical structure, which compresses the perforated gasket 16 while allowing the wire 6 to pass through a hollow part of the gasket upper end cover 14.

In addition, a side of the perforated gasket 16 facing away from the gasket upper end cover 14 is also provided with a gasket supporting base 15. The gasket supporting base 15 is connected to the small diameter part 20, and the gasket supporting base 15 is also a hollow cylindrical structure. The gasket supporting base 15, the perforated gasket 16, and the gasket upper end cover 14 are concentrically arranged to facilitate the passage of wire 6.

In an embodiment, the pressure cap 12 is buckled on the sealing plug 11 and threaded to the sealing plug 11, the pressure cap 12 defines a through hole 21 adapted to the gasket upper end cover 14, and an end of the gasket upper end cover 14 facing away from the perforated gasket 16 is disposed inside the through hole 21.

A lateral surface of the gasket upper end cover 14 is provided with protrusions 22, and the protrusions 22 abut against the pressure cap 12. Positioning pins 13 are provided on the protrusions 22, and the positioning pins 13 are inserted into pin holes 23 at an end of the sealing plug 11 respectively.

Specifically, the pressure cap 12 is disposed at an end of the sealing plug 11 facing away from the pressure-resistant shell 4. The pressure cap 12 defines an inner chamber inside the pressure cap 12, and the inner chamber is buckled on the end of the sealing plug 11 through the inner chamber of the pressure cap 12. Sides of the protrusions 22 facing away from the perforated gasket 16 abut against an inner wall surface of the inner chamber. The protrusions 22 is circular and distributed around the outer surface of the gasket upper end cover 14. Multiple positioning pins 13 are arranged around the protrusions 22 to achieve positioning.

During a specific implementation, by rotating the pressure cap 12, the gasket upper end cover 14 can be pushed to squeeze the perforated gasket 16, which causes the inner diameter of the perforated gasket 16 to shrink and compress the wire 6, thereby forming the sealing structure.

The above embodiments are only a description of the illustrated implementation of the disclosure and do not limit the scope of the disclosure. Without departing from the design spirit of the disclosure, all changes, variations, modifications, and replacements made by those skilled in the art to the technical solution of the disclosure should fall within the scope of protection determined by the claims of the disclosure.

What is claimed is:

1. A low-frequency acoustic wave generating device, comprising: a sealing shell configured to be communicated with a pipeline, wherein a sealed pressure environment is formed inside the sealing shell, a low-frequency electroacoustic transducer is disposed inside the sealing shell, the low-frequency electroacoustic transducer is connected to a signal generator and is configured to transmit an acoustic wave into the pipeline;

wherein the sealing shell comprises a pressure-resistant shell and a connecting head, the pressure-resistant shell defines a sealing chamber with an opening, the connecting head defines a hollow structure and is communicated with the sealing chamber, an end of the connecting head is detachably connected to an end at the opening of the pressure-resistant shell, and another end of the connecting head extends out of the pressure-resistant shell and is configured to be communicated with the pipeline;

wherein the low-frequency electroacoustic transducer is disposed in the sealing chamber, and an acoustic emission end of the low-frequency electroacoustic transducer faces towards the hollow structure of the connecting head;

wherein the low-frequency electroacoustic transducer is connected to a signal generator through a wire, the wire extends out of the pressure-resistant shell, and a part of the wire passing through the pressure-resistant shell is sealed by a sealing mechanism; the sealing mechanism comprises a sealing plug, the sealing plug is detachably connected to the pressure-resistant shell, the sealing plug defines a wire threading hole communicated with the sealing chamber, and the wire extends from the wire threading hole; a perforated gasket sleeved on the wire is disposed in the wire threading hole, and the perforated gasket is in a squeezed state, thereby forming a sealed connection between the wire and the perforated gasket;

wherein the wire threading hole is in a stepped hole structure comprising a large diameter part and a small diameter part, the large diameter part is provided with a gasket upper end cover, and the perforated gasket is disposed in the large diameter part; a side of the perforated gasket abuts against the small diameter part, and another side of the perforated gasket abuts against the gasket upper end cover; the wire passes through the gasket upper end cover, the sealing plug is detachably connected to a pressure cap, and the pressure cap compresses the gasket upper end cover.

2. The low-frequency acoustic wave generating device as claimed in claim 1, wherein an end of the connecting head disposed in the sealing chamber is in a clearance distribution with the low-frequency electroacoustic transducer.

3. The low-frequency acoustic wave generating device as claimed in claim 2, wherein the low-frequency electroacoustic transducer is disposed at the end of the connecting head disposed in the sealing chamber of the pressure-resistant shell.

4. The low-frequency acoustic wave generating device as claimed in claim 3, wherein the low-frequency electroacoustic transducer is connected to the end of the connecting head through screws, gaskets are sleeved on the screws respectively, the gaskets are disposed between the end of the connecting head and the low-frequency electroacoustic transducer, thereby forming a gap.

5. The low-frequency acoustic wave generating device as claimed in claim 1, wherein the hollow structure of the connecting head is in a cone-shape, and the end of the connecting head with a larger end surface compared to that of the another end of the connecting head is disposed in the sealing chamber.

6. The low-frequency acoustic wave generating device as claimed in claim 1, wherein the pressure cap is buckled on the sealing plug and threaded to the sealing plug, the pressure cap defines a through hole adapted to the gasket upper end cover, and an end of the gasket upper end cover facing away from the perforated gasket is disposed inside the through hole;

wherein a lateral surface of the gasket upper end cover is provided with protrusions, the protrusions abut against the pressure cap, positioning pins are provided on the protrusions, and the positioning pins are inserted into pin holes at an end of the sealing plug respectively.

\* \* \* \* \*